United States Patent Office 3,493,394
Patented Feb. 3, 1970

3,493,394
GELLED FLAVORED SPREAD
Kenneth E. Eldridge, Ridgewood, and Lino L. Linteris, Demarest, N.J., assignors to Lever Brothers Company, New York, N.Y., a corporation of Maine
No Drawing. Filed June 2, 1966, Ser. No. 554,666
Int. Cl. A23l 1/04
U.S. Cl. 99—132                                8 Claims

ABSTRACT OF THE DISCLOSURE

A process for making a spread including the steps of preparing a fruit preserve stock in liquid form, dispersing fat as a discontinuous phase throughout the fruit preserve stock, and causing the latter to gel to provide a homogeneous, nonseparating spread.

---

This invention relates to flavored spreads for bread and the like. More particularly, the invention relates to novel combinations of edible fat with fruit preserves, such as jams and jellies.

Jams, jellies and other fruit preserves are used as spreads for bread, toast, rolls, muffins, pancakes and the like. Many consumers also apply butter or margarine to these items at the same time. It is generally considered that provision of a mixture of these materials would be desirable and would provide the advantage that both can be applied to the bread, etc. in one spreading operation.

Simple mixtures of margarine or butter with jams or jellies have been made by stirring the two together. When this occurs, however, the structure of the jam or jelly is broken and the syrup formally held by the jam or jelly structure will separate from the mixture.

It has now been found that an excellent spread can be made by (1) preparing a fruit preserve stock in liquid form to a point short of gelation, (2) combining an edible fat in liquid form with the liquid fruit preserve stock to obtain a uniform mixture, and (3) by thereafter initiating gelling of the liquid preserve stock to form a homogeneous, gelled, non-separating spread. The resulting product can be made in large batches in liquid form and can then be placed in a suitably sized container where it will gel to a consistency and structure similar to jam or jelly.

The resulting product has the advantages of a pleasing appearance, a desirable texture, and an excellent flavor. It will not separate into aqueous and fatty layers during storage.

The fruit preserve stock of this invention may be jelly or jam stock. A jelly stock can be prepared by blending concentrated fruit juices with sugar, pectin, water and a buffer salt, if desired. Alternatively, a jelly stock may be prepared by cooking fruit juices with pectin, sugar or buffer salts. Exemplary juices which may be used according to this invention, include those of blueberry, apple, grape, raspberry and strawberry. Other suitable fruit juices include those listed on pages 62 and 63 of the Preservers Handbook, Sunkist Growers, Inc., Ontario, Calif., 7th ed.

A jam stock is suitably prepared by cooking whole fruit or fruit pieces with pectin, sugar, water and a buffer salt, if desired. Suitable fruits include strawberries, blackberries, raspberries, oranges, pineapples and any other fruit ordinarily used in preparing preserves.

The edible fat which is used in preparing the compositions of this invention may be a salad oil which is liquid at room temperature, such as corn, cottonseed, safflower, soybean, sunflower, peanut and other liquid edible oils. Alternatively, the fat component may be a semi-solid fat, such as coconut oil, lard tallow, palm oil, or partially hydrogenated edible fats or oils. Butter and margarine make excellent products. Where fats are used which partially crystallize at storage temperatures, the product is opaque. On the other hand, a translucent product results where fats which remain liquid at storage temperatures are used.

The sugars useful in preparing the fruit preserve stock include sucrose, invert sugar, dextrose, corn syrup solids, or any combination of these sugars. Where corn syrup solids are used they may be used at levels of up to about 25% of the total sugar content.

The pectin used may be either of the rapid set or slow set types, preferably the latter. It may be standardized with carbohydrate materials and preferably contains sodium bicarbonate to aid in dissolving the pectin. The pectin is preferably used at a level of about 0.9% by weight of added sugar solids in a jelly or jam containing 68% to 69% solids. The level may be increased to 1.2% of the sugar weight for jellies containing 65% solids or decreased to 0.5% of the sugar weight for jellies or jams containing 70% solids. The pectin level may also be varied according to the type of fruit and its naturally occurring pectin content and type.

The buffer salt may be either sodium citrate or potassium tartrate, and may be added at levels of about 3 oz. per 100 pounds of sugar to give a jelly stock having a pH from 3.6 to 4.2.

A typical jelly can be prepared from fruit juice by heating the juice to about 150° F., blending the required dry pectin with 3–8 times its weight of dry sugar, blending the sugar-pectin mixture with the hot juice and heating the mixture to 180° F. to dissolve the pectin. The desired amount of sugar is then added along with a buffer salt, if needed, and the mixture is cooked until a solids level of 65% to 70%, preferably 68% to 69%, as measured by the Bausch and Lomb high range sugar refractometer, is reached. The jelly stock is then cooled to 130° F. to 140° F. where it remains in liquid form and is ready for subsequent steps in the process.

An alternative method of preparing a jelly stock in accordance with this invention includes the blending of the required amount of dry pectin with 3 to 8 times its weight of sugar, dissolving this mixture in water (about 20 times the weight of pectin) at 150° F. to 180° F., and thereafter adding the pectin solution, buffer salt and sugar to a juice concentrate to give a mixture containing 65% to 70% soluble solids. This mixture is heated to 143° F. for ten minutes to pasteurize the product and then cooled to 130° F. to 140° F. for subsequent use in the process of this invention.

Referring to pectin containing sodium bicarbonate, water is heated to 150° C. and the pectin is added to the water with vigorous agitation. The bicarbonate inhibits clumping, hastens solution and eliminates the need for blending with dry sugar. The preferred pectin is 150 grade, of the slow set type. A rapid set pectin may be used, but requires more care during processing to avoid premature gelation before the spread can be placed in the consumer size container.

The temperature at which the spread of this invention is prepared is an important consideration in conducting the process of this invention. The temperature must be maintained at a level high enough to avoid gelation of the product before it is filled into a container. The minimum temperature required will vary with the soluble solids and pectin content of the product, with the amount of natural and added buffers and with the final pH. A temperature as low as 100° F. may be used if the final pH adjustment causing gelation is made by metering an acid solution into the spread just prior to placing it in a container. Higher temperatures, in the order of 135° F. to 140° F. are normally used to allow sufficient time to place the product in the container before onset of gelation. Temperatures above 150° F. are generally avoided where possible, to prevent undesirable flavor changes in the product.

Although a 3:1 ratio of jelly to margarine is preferred, the product of this invention can contain from 65% to 95% jelly and 35% to 5% margarine. If this is determined on the basis of fat content alone, as little as 4% fat or as much as 35% fat may be used.

The step of mixing the preserve stock with the fat may be conducted by any means which provides a fine dispersion of the oil in the liquid preserve stock. In the case of a mixture of a jelly stock and a liquid fat, it is preferred that the mixing be accomplished with homogenization, and passing the mixture through a two-stage Manton-Gaulin homogenizer at 2,000 p.s.i.g. at the first stage, and 1,000 p.s.i.g at the second stage provides excellent results. In the case of spreads based on a jam stock, homogenization is not necessary and mixing of the two stocks in a mixer with counter rotating blades until the margarine is thoroughly dispersed is sufficient.

The final pH adjustment in the spread is made for the purpose of bringing the spread to a pH which is optimum for gelation of the pectin content therein. Considerations here follow those of normal jelly and jam making practices. The acid requirements for each batch is determined by titrating a weighed portion thereof with a pH meter to determine the end point. If slow set pectin is used, the optimum pH may vary from 2.7 to 3.25 but preferably should be 2.9 to 3.15. The higher portion of the pH range can be tolerated in products with a higher soluble solids content. If a rapid set pectin is used the optimum pH range is 3.1 to 3.4. Thus the spreads of this invention can be made over a pH range of about 2.7 to about 3.4.

Standard acids are used to make the final pH adjustment. Phosphoric acid, tartaric acid, vinegar or lime juice, lactic acid, malic acid or any combination of these may be employed.

After filling the spread into a container, it may be stored at room temperature, but is preferably stored at 45° F.

Example 1

A spread containing grape jelly and margarine was prepared. The margarine phase of the product had the following composition:

| Margarine blend | Percent |
| --- | --- |
| Nonfant dry milk solids | 1.60 |
| Water | 15.92 |
| Salt | 1.98 |
| Sodium benzoate | 0.10 |
| Cottonseed oil (refined, bleached, deodorized) | 78.85 |
| Monoglyceride concentrates | 0.33 |
| Lecithin | 0.22 |
| Color (10% in cottonseed oil) | 1.00 |
| Flavors, 30 p.p.m. | |
| | 100.00 |

The margarine emulsion was prepared by separately preparing the aqueous and fat phases and by thereafter blending the aqueous and melted fat phases together. The emulsion was held in the liquid form at slightly elevated temperature until used.

A grape jelly stock was prepared by combining the following ingredients in the indicated proportions:

| | Percent |
| --- | --- |
| Sugar | 60.7 |
| Grapejuice concentrate 68° Brix | 10.7 |
| Water | 27.94 |
| Pectin, 150 grade, slow set | 0.55 |
| Sodium citrate | 0.11 |
| (Actual 67.9–68.1% soluble solids) | 100.00 |

The required amount of water, at a temperature of 150° F., was drawn into a mixing tank. The pectin was dissolved in the water. The juice concentrate, sodium citrate, and sugar were added, dissolved, and the solution was heated to 143° F. to pasteurize it. The stock was then cooled to 140° F. and combined with the previously prepared margarine blend at the same temperature. The jelly stock and margarine blend were combined in the proportions of about 73.65 parts of jelly stock to 25 parts of the margarine blend. The total batch weight was 7200 pounds. Since the product would gel before this large size batch could be packed, the batch was homogenized in separate portions, weighing about 370 pounds each, acidified and filled into consumer size containers at a temperature of 128° F.–131° F. The acid requirement was 1900 ml. of 45.6% citric acid solution per each 370 pound batch of spread. Gelling of the mixture started within a short time, and it was well set after two days. No oil separation occurred.

Example 2

A strawberry jam flavored spread was prepared by combining a strawberry jam stock with a margarine emulsion.

The strawberry jam stock had the following formula:

| Strawberry jam: | | Percent |
| --- | --- | --- |
| Frozen strawberries (4 parts berries—1 part sugar) | grams | 4,390 |
| Sugar | do | 3,410 |
| Sodium citrate | do | 7.9 |
| Pectin, Exchange citrus pectin slow set 150 grade No. 3454 | grams | 39 |
| Water | ml | 800 |

In preparing the strawberry jam stock, the pectin was blended with about 200 grams of the sugar, the blend was added to the water at 150° F. and heated to about 200° F. to insure that the pectin was dissolved. The frozen strawberries were thawed and blended with the sugar and pectin solution and sodium citrate. The mixture was cooked to a soluble solids content of 71.3%. The jam stock was then diluted with water to a soluble solids content of 68%.

Two thousand grams of a margarine emulsion was prepared having the following formula:

| Margarine: | Percent |
| --- | --- |
| Cottonseed salad oil | 79.75 |
| Monoglycerides | 0.33 |
| Lecithin | 0.22 |
| Nonfat dry milk solids and water | 17.517 |
| Salt | 1.98 |
| Sodium benzoate | 0.10 |
| FD and C colors | 0.10 |
| Flavor | 0.003 |
| Vitamin A—16,000 USP units/pound. | |
| Vitamin D—2,200 USP units/pound. | |

Six thousand grams of the diluted jam stock was blended with 2,000 grams of the margarine emulsion. The acid requirement for optimum pH for gelation was determined to be 92 ml. of a 45.6% aqueous citric acid solution per 8,000 grams of spread. The blend was mixed 15 minutes in a Hobart mixer at 140° F. The acid was added, and the mixing was continued for an additional 5 minutes. The product was then filled into containers at 122° F. The pH of the product was 3.06. The product had a good appearance, a good gel strength and satisfactory spreadability.

Example 3

A margarine emulsion having the formula set forth below was prepared and held at 135° F.

| Margarine blend: | Grams |
| --- | --- |
| Limpid cottonseed oil | 7957 |
| Monoglycerides | 73 |
| Water | 1601 |
| Nonfat dry milk solids | 161 |
| Salt | 198 |
| Sodium benzoate | 10 |

A jelly stock was prepared by combining the ingredients given below in the manner described in Example 1 above, and a soluble solids content of 68% was obtained Jelly stock formulation:                                  Gdams
    Strawberry juice concentrate, 36° Brix _____ 1278
    Sucrose _____ 6975
    Water _____ 2678
    Pectin, 150 grade, slow set _____ 63
    Sodium citrate _____ 5.5

Two thousand grams of the margarine emulsion and 6,000 grams of the strawberry jelly stock where mixed at 140° F. and homogenized at 3,000 p.s.i.g. The product was then acidified with 64 ml. of an aqueous citric acid solution containing 45.6% acid. The product was immediately filled into containers at 120° F. After setting for two days, a strong, semi-translucent gel with no visible free oil was formed.

Example 4

A spread was prepared using 75% of a grape jelly stock made in accordance with Example 1 above, and 25% of a margarine emulsion made with a semi-solid fat. The margarine emulsion was the same as the formula given in Example 1 except that the cottonseed oil was replaced by a partially hydrogenated fat having the following SFI values.

| Temp. °C.: | Approx. SFI values |
|---|---|
| 21.1 | 13.4 |
| 33.3 | 2.2 |
| 42.0 | 0 |

The jelly stock and margarine emulsion were combined at a temperature of 140° F., homogenized, acidified to pH 3.0, filled into containers and stored at 45° F.

Arbitrary translucency values were determined for the spreads made in accordance with Example 1, made with a liquid oil, and for the spread made in accordance with this example. A comparison of these values showed that the liquid oil spread was about 1.8 times as translucent as the semi-solid fat spread. The translucency values were derived from the differences in reflectance with alternate use of a white and a black backing on a 1.6 mm. cell in a General Electric spectrophotometer with integrating sphere optics.

We claim:

1. A process for preparing a spread which comprises preparing a fruit preserve stock containing pectin under conditions which permit the stock to remain in liquid form, combining an edible fat in liquid form with the liquid stock under conditions non-gelling to both liquids to provide an emulsion, and thereafter changing the conditions of the emulsion to permit gelling of the stock and to provide a homogeneous non-separating spread.

2. A process for preparing a spread which comprises preparing a fruit preserve stock containing pectin under pH and temperature conditions which permit the stock to remain in liquid form, combining an edible fat in liquid form with the liquid stock under conditions non-gelling to both liquids to provide an emulsion, and thereafter changing the pH and temperature conditions to permit gelling of the stock and to provide a homogeneous non-separating spread.

3. The process of claim 2 wherein the fat is margarine.
4. The process of claim 2 wherein the fat is butter.
5. The process of claim 2 wherein the fat is a salad oil.
6. The process of claim 2 wherein the fruit preserve stock is a jelly stock, and the two liquids are homogenized prior to the gelation step.
7. The process of claim 2 wherein the stock is a jam stock.
8. The process of claim 2 wherein the emulsion is placed in a consumer-sized container before substantial gelling thereof takes place.

References Cited

UNITED STATES PATENTS

| 2,203,643 | 6/1940 | Musher _____ 99—144 |
| 2,718,468 | 9/1955 | Jones et al. _____ 99—121 |

RAYMOND N. JONES, Primary Examiner

J. M. HUNTER, Assistant Examiner

U.S. Cl. X.R.

99—129

UNITED STATES PATENT OFFICE

Certificate

Patent No. 3,493,394　　　　　　　　　　　　　　　Patented February 3, 1970

Kenneth E. Eldridge and Lino L. Linteris

Application having been made by Kenneth E. Eldridge and Lino L. Linteris, the inventors named in the patent above identified, and Lever Brothers Company, New York, N.Y., a corporation of Maine, the assignee, for the issuance of a certificate under the provisions of Title 35, Section 256, of the United States Code, adding the name of Norman E. Bednarcyk as a joint inventor, and a showing and proof of facts satisfying the requirements of the said section having been submitted, it is this 23rd day of March 1971, certified that the name of the said Norman E. Bednarcyk is hereby added to the said patent as a joint inventor with the said Kenneth E. Eldridge and Lino L. Linteris.

FRED W. SHERLING
*Associate Solicitor.*